United States Patent
Lyons (10) Patent No.: US 9,132,792 B2
(45) Date of Patent: Sep. 15, 2015

(54) VEHICLE BATTERY STORAGE COMPARTMENT

(75) Inventor: Travis Lyons, Mount Holly, NC (US)

(73) Assignee: HUSQVARNA AB, Huskvarna (SE)

( * ) Notice: Subject to any disclaimer, the term of this patent is extended or adjusted under 35 U.S.C. 154(b) by 2 days.

(21) Appl. No.: 14/115,499

(22) PCT Filed: May 13, 2011

(86) PCT No.: PCT/US2011/036487
§ 371 (c)(1),
(2), (4) Date: Nov. 4, 2013

(87) PCT Pub. No.: WO2012/158150
PCT Pub. Date: Nov. 22, 2012

(65) Prior Publication Data
US 2014/0083787 A1 Mar. 27, 2014

(51) Int. Cl.
*B60R 16/04* (2006.01)
*B29D 99/00* (2010.01)
*H01M 2/10* (2006.01)

(52) U.S. Cl.
CPC .............. *B60R 16/04* (2013.01); *B29D 99/001* (2013.01); *H01M 2/1083* (2013.01)

(58) Field of Classification Search
CPC ........................................................ B60K 1/04
USPC ............................ 180/69.24, 68.5; 296/24.3
See application file for complete search history.

(56) References Cited

U.S. PATENT DOCUMENTS

| | | | |
|---|---|---|---|
| 3,583,513 A * | 6/1971 | Macadam et al. | 180/69.24 |
| 3,743,045 A * | 7/1973 | Hansen | 180/69.24 |
| 4,779,692 A * | 10/1988 | Hagarty et al. | 180/68.5 |
| 4,930,300 A * | 6/1990 | Benter et al. | 56/16.7 |
| 5,246,793 A | 9/1993 | Scott | |
| 5,301,494 A * | 4/1994 | Peot et al. | 56/10.5 |
| 5,392,873 A | 2/1995 | Masuyama et al. | |
| 5,540,037 A * | 7/1996 | Lamb et al. | 56/7 |
| 6,017,083 A * | 1/2000 | Edgeller | 296/185.1 |
| 6,029,762 A * | 2/2000 | Kepner | 180/65.1 |
| 7,134,519 B2 * | 11/2006 | Imashige | 180/69.24 |
| 8,720,628 B2 * | 5/2014 | Fuchibe | 180/69.2 |
| 8,833,500 B2 * | 9/2014 | Nakamura et al. | 180/69.2 |
| 2014/0083787 A1 * | 3/2014 | Lyons | 180/68.5 |

FOREIGN PATENT DOCUMENTS

TW 201024136 A 7/2010

OTHER PUBLICATIONS

International Search Report and Written Opinion for PCT/US2011/036487 mailed Aug. 29, 2011, all enclosed pages cited.
Chapter I International Preliminary Report on Patentability for PCT/US2011/036487 issued Nov. 19, 2013, all enclosed pages cited.

* cited by examiner

*Primary Examiner* — Jeffrey J Restifo
(74) *Attorney, Agent, or Firm* — Nelson Mullins Riley & Scarborough LLP (57) ABSTRACT

A riding vehicle may include a battery compartment and one or more grip tabs. The battery compartment may be configured to house a battery of the riding vehicle. The one or more grip tabs may be disposed in the battery compartment and may extend from one or more walls of the battery compartment to engage the battery in response to insertion of the battery into the battery compartment. The one or more grip tabs and the battery compartment may be formed from a same unitary piece of material.

20 Claims, 11 Drawing Sheets

VEHICLE BATTERY STORAGE COMPARTMENT

TECHNICAL FIELD

Example embodiments generally relate to vehicles and, more particularly, relate to vehicles configured for performing lawn maintenance.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines (e.g., less than 200 cubic centimeters (cc)) and are relatively inexpensive. Meanwhile, at the other end of the spectrum, riding lawn mowers, such as lawn tractors, can be quite large and sometimes have engines exceeding 400 cc. Riding lawn mowers can sometimes also be configured with various functional accessories (e.g., trailers, tillers and/or the like) in addition to grass cutting components. Manufacture of these often complex machines can be expensive and every additional component of the vehicle adds further cost and time to the production process.

Riding lawn mowers, like many other riding vehicles, can experience a relatively high amount of vibration during operation. Moreover, depending on the terrain on which they are used, riding vehicles may also encounter a significantly rough or bouncy ride. The vibrations and undulations experienced during normal operation may cause shocks that induce certain components, such as the battery and cables, to shift position or even break if these components are not properly secured. Elastic straps or screw down clamps are often used to secure at least the battery within the riding vehicle.

BRIEF SUMMARY OF SOME EXAMPLES

Accordingly, in order to provide a mechanism by which to enable the battery and battery cables to be securely held without requiring significant expense or the inclusion of additional parts, some example embodiments may provide for the inclusion of a battery compartment having grip tabs provided therein. In some cases, the grip tabs may be configured to securely hold the battery in place as the battery is inserted into the battery compartment. Some embodiments may also include a cable pocket within the battery compartment. In an example embodiment, the cable pocket may include cable clamps that hold a portion of the battery cables in a fixed position so that the cables may fold into the cable pocket when the battery is inserted fully into the battery compartment to avoid situations where the battery cables would otherwise be pushed out the back of the battery compartment when the battery is inserted therein.

In one example embodiment, a riding vehicle is provided. The riding vehicle may include a battery compartment and a grip tab. The battery compartment may be configured to house a battery of the riding vehicle. The grip tab may be disposed in the battery compartment and may extend from a wall of the battery compartment to engage the battery in response to insertion of the battery into the battery compartment. The grip tab and at least a portion of the battery compartment may be formed from a same unitary piece of material.

In another example embodiment, a panel attachable to a riding lawn mower is provided. The panel may include a battery compartment and a grip tab. The battery compartment may be configured to house a battery of the riding lawn mower. The grip tab may be disposed in the battery compartment and may extend from a wall of the battery compartment to engage the battery in response to insertion of the battery into the battery compartment. The grip tab and at least a portion of the battery compartment are formed from a same unitary piece of material.

In another example embodiment, a method of manufacturing a battery compartment for a riding vehicle is provided. The method may include molding a panel of the riding vehicle such that the panel comprises an integrated battery compartment and grip tab formed from a same first unitary piece of material. The battery compartment may be configured to house a battery of the riding vehicle. The grip tab may be disposed in the battery compartment and extend from a wall of the battery compartment to engage the battery in response to insertion of the battery into the battery compartment.

Some example embodiments may enable the provision of a battery compartment that securely holds the battery in place in the presence of vibration and other shocks that may be encountered during operation of a riding vehicle. Some example embodiments may also enable provision of a battery compartment to securely hold battery cables to prevent them from being pushed out of the battery compartment responsive to insertion of the battery into the battery compartment. Moreover, some example embodiments may accomplish either or both of the above described tasks using a single piece of molded plastic or other material in order to reduce cost and complexity. Accordingly, for example, both the battery and its cables may be securely held without the addition of further components to a riding vehicle such as a riding lawn mower.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1, which includes

FIG. 5, which includes

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the term "panel" should be understood to refer to a component, piece or portion of a riding vehicle including, for example, a body panel, cover or portion of a cover, frame member, and/or the like.

Example embodiments may provide for a mechanism by which to securely hold the battery and battery cables of a riding vehicle such as, for example, a riding lawn mower. In this regard, some example embodiments may provide for a battery compartment molded within a single panel, such as, for example, a back panel attachable to the rear of the riding vehicle. The battery compartment may also include one or more grip tabs that are part of the same unitary piece of material that is molded into the back panel. The grip tabs may be positioned on multiple sides of the battery to apply a force on the sides of the battery responsive to insertion of the battery into the battery compartment. Thus, the grip tabs may securely hold the battery in place in the presence of vibration and other undulating forces without requiring inclusion of additional parts. As such, additional parts need not be added to the battery compartment or the riding vehicle in general, in order to securely hold the battery in place.

In some cases, the battery compartment may also include a cable pocket within the battery compartment. The cable pocket may include cable clamps that hold the battery cables in place at the point of insertion of the battery cables into the cable pocket. The cable clamps may therefore allow the cables to fold into the cable pocket when the battery is inserted fully into the battery compartment. Moreover, the cable clamps may prevent the cables from simply being pushed out of the back of the battery compartment when the battery is inserted into the battery compartment. The cable clamps and cable pocket may, thereby, result in safe storage of the cables out of the way of other components of the riding vehicle. Like the grip tabs, the cable clamps are, in at least some embodiments, part of the same unitary piece of material that is molded into the back panel.

Figure 1A:
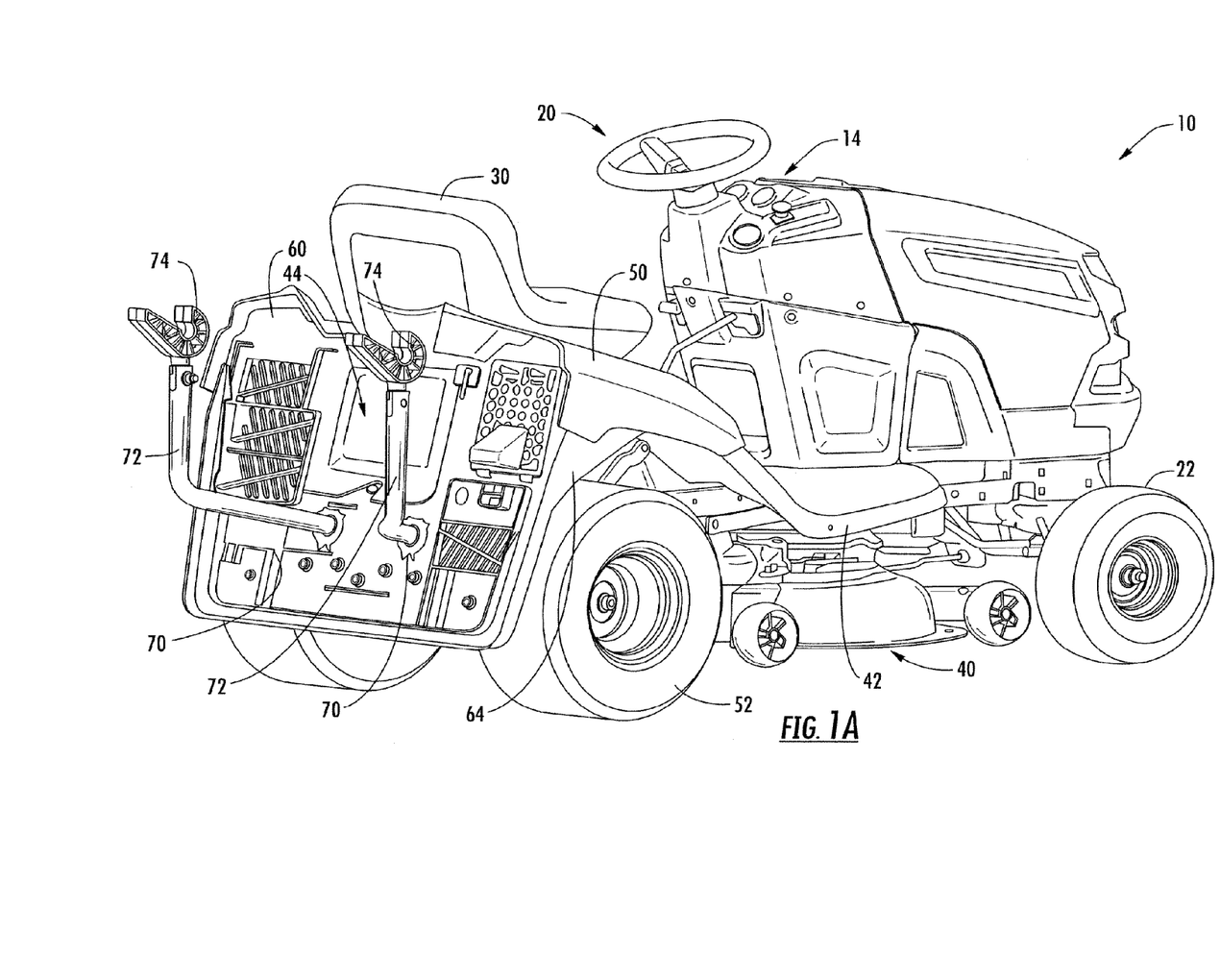
FIGS. 1A and 1B, illustrates a perspective view of a riding vehicle having a bagging attachment removed (FIG. 1A) and installed (FIG. 1B) according to respective different conditions of an example embodiment.
Figure 1B:
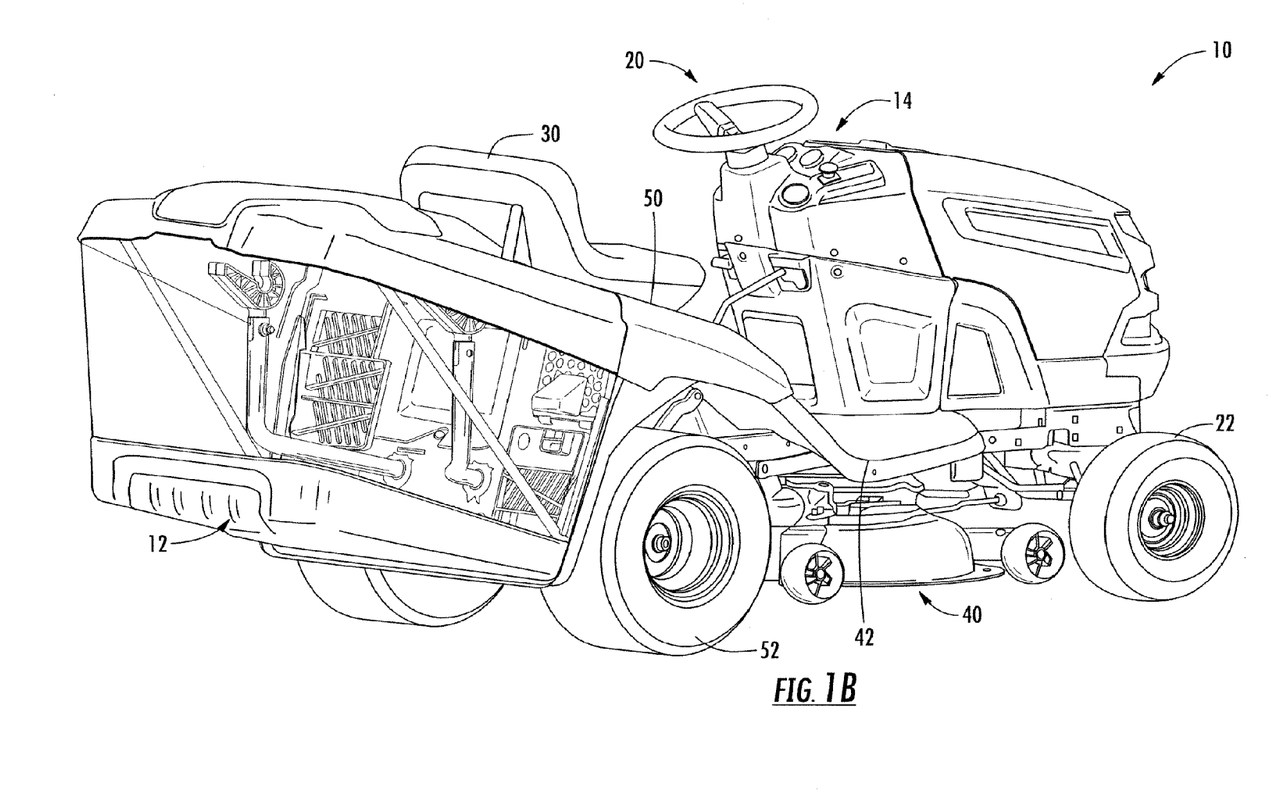

FIG. 1, which includes FIGS. 1A and 1B, illustrates a perspective view of a riding vehicle 10 having a bagging attachment 12 removed (FIG. 1A) and installed (FIG. 1B) according to respective different conditions of an example embodiment. As shown and described herein, the riding vehicle 10 may be a riding lawn mower, such as, for example, the center rear discharge lawn tractor shown in the figures. However, it should be appreciated that example embodiments may also be practiced in connection with other riding vehicles or other lawn mowers. In some embodiments, the riding vehicle 10 may include an information panel 14 that may include gauges and/or controls related to operation of the riding vehicle 10.

In an example embodiment, the riding vehicle 10 may include a steering assembly 20 (e.g., a steering wheel, handle bars, or the like) functionally connected to front wheels 22 of the riding vehicle 10 to allow the operator to steer the riding vehicle 10. The operator may sit on a seat 30 positioned on the riding vehicle 10 rearward of the steering assembly 20. The riding vehicle 10 may also include a cutting deck 40 having at least one cutting blade mounted therein. The cutting deck 40 may be positioned behind the front wheels 22 in a position to enable the operator to cut grass using the cutting blade when the cutting blade is rotated below the cutting deck 40. In some embodiments, a footrest 42 (e.g., one on each side of the riding vehicle 10) may also be positioned above the cutting deck 40 to enable the operator to rest his or her feet thereon while seated in the seat 30. When operating to cut grass, the grass clippings may be expelled from the cutting deck 40 via a rear discharge 44. The rear discharge 44 may be positioned below the seat 30 and may expel the grass clippings out of a discharge path positioned in the center portion of the back of the riding vehicle 10 into the bagging attachment 12, when the bagging attachment 12 is attached to the riding vehicle 10.

In the pictured example embodiment, the engine of the riding vehicle 10 is positioned in front of the operator. However, in other example embodiments, the engine could be in different positions such as below or behind the operator. As shown in FIG. 1, the riding vehicle 10 may include rear fenders 50 positioned proximate to rear wheels 52. The rear fenders 50 may form a portion of the body of the riding vehicle and the rear fenders 50 may include a rear surface that is shaped to connect to or otherwise mate with top portions of a back panel 60. The back panel 60 may be shaped to connect to or otherwise mate with the bagging attachment 12 to form a seal between the bagging attachment 12 and the back panel 60.

As shown in FIG. 1A, when the bagging attachment 12 is removed, the back panel 60 is exposed and forms a substantial portion of the back end of the riding vehicle 10. In this regard, the back panel 60 extends to substantially cover an entirety of the rear of the frame of the riding vehicle 10. A bagging attachment support structure 70 extends through the back panel 60 out the rear of the riding vehicle 10. The bagging attachment support structure 70 of this example embodiment includes two support rods 72. The support rods 72 of this example are substantially L-shaped and connect to the frame of the riding vehicle 10 via openings in the back panel 60. The support rods 72 initially extend off of the riding vehicle in a direction that is substantially parallel to a plane in which the bottom of the bagging attachment 12 lies when the bagging attachment 12 is attached to the riding vehicle 10. The support rods 72 may include a bend, forming the L-shape, that extends the support rods 72 away from the bottom of the bagging attachment 12. The bagging attachment support structure 70 may include carriage receptacles 74 disposed at distal ends of the support rods 72. The carriage receptacles 74 may be shaped to receive a portion of a carriage assembly (not shown) of the bagging attachment 12 and to support the weight of the bagging attachment 12 when the bagging attachment 12 is attached to the riding vehicle 10.

Figure 2:
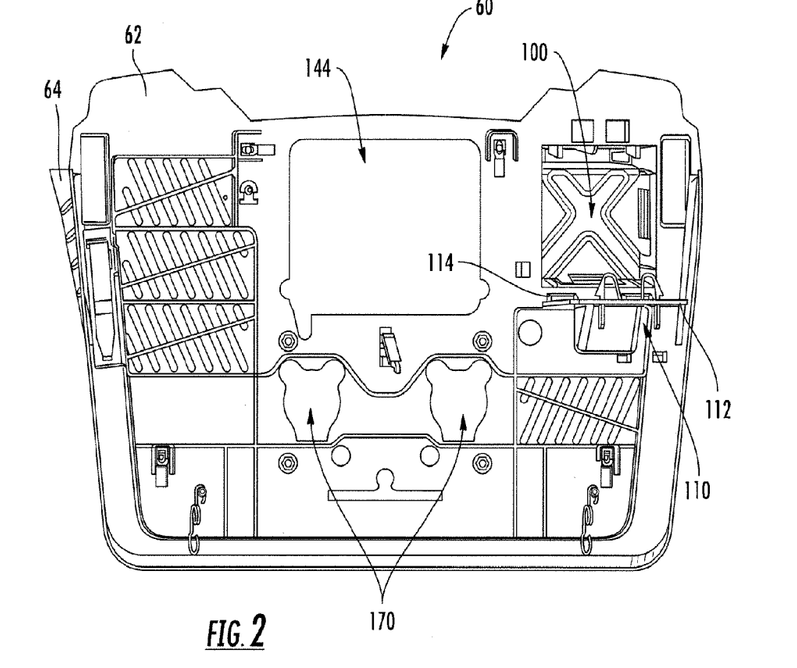
FIG. 2 illustrates an isometric view of a back panel of the riding vehicle of FIG. 1 according to an example embodiment.
Figure 3:
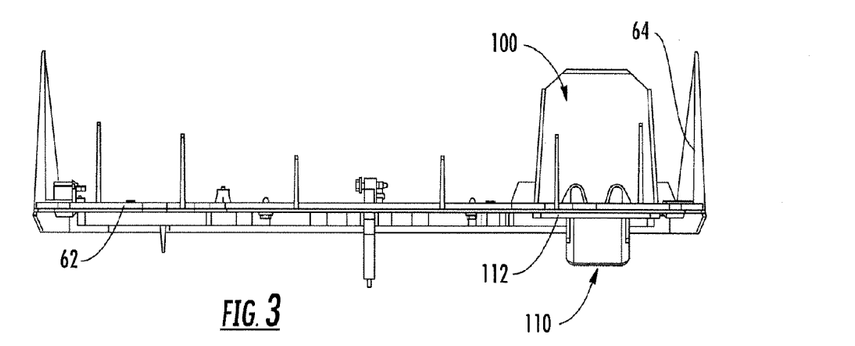
FIG. 3 illustrates a top view of the back panel according to an example embodiment.
Figure 4:
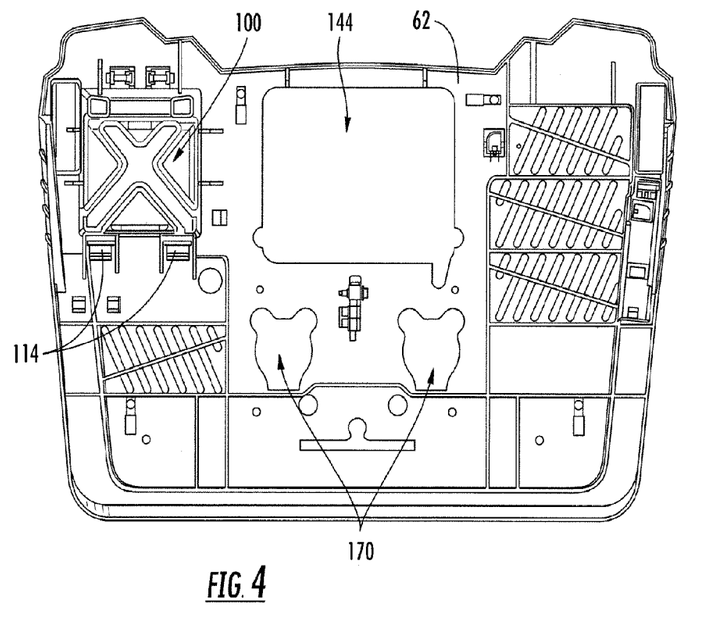
FIG. 4 illustrates a rear view of the back panel according to an example embodiment.

FIG. 2 illustrates an isometric front view of the back panel 60 of the riding vehicle 10 of FIG. 1 according to an example embodiment. In other words, the view shown in FIG. 2 is the view that would be seen when looking at a back end of the riding vehicle 10 with the bagging attachment 12 removed. As can be seen in FIG. 2, the back panel 60 is a single piece of material. In some example embodiments, the back panel 60 may be formed using a molding process, such that the entire back panel 60 is formed from a unitary piece of molded plastic or other material. As such, the back panel 60 may provide a common platform to be fixed to the rear of the riding vehicle in order to provide a plurality of fittings, orifices, connectors, functional features and/or the like to facilitate connection and/or interoperability with various other portions, components and systems of the riding vehicle 10. The back panel 60 may be formed such that a majority of the material of the back panel 60 forms a panel body 62 that lies in a same plane that is parallel to the rear of the riding vehicle 10 when the back panel 60 is installed on the riding vehicle 10. FIG. 3, which illustrates a top view of the back panel 60 from directly above the back panel 60, helps to illustrate the plate-like shape of the panel body 62. Meanwhile, FIG. 4 illustrates a rear view of the back panel 60. In other words, FIG. 4 illustrates a view of the back panel 60 as it would appear if the back panel 60 was removed from the rear of the riding vehicle 10 and the side of the back panel 60 that faces toward the riding vehicle 10 when the back panel 60 is attached was viewed. Further description of the back panel 60 will now be made in reference to FIGS. 2-4.

In some embodiments, the back panel 60 may include several orifices providing passages through the panel body 62 and several protrusions for facilitating connection to the riding vehicle 10 or other components and/or storage pockets as described in greater detail below. The orifices may include, for example, a rear discharge receiver 144 and support rod receivers 170 that are configured to facilitate connection of the rear discharge 44 and insertion of the support rods 70 through the back panel 60. The back panel 60 may also include flares 64 (see also FIG. 1) that extend under a portion of the rear fenders 50 to form a wheel well for the rear wheels 52.

In an example embodiment, the back panel 60 may include a battery compartment 100. The battery compartment 100 may form a recessed pocket when viewed from the front of the back panel 60 (as shown in FIG. 2), and therefore also form a protrusion relative to a rear view of the back panel 60 (as shown, for example, in FIG. 4). As such, the battery compartment 100 may form a pocket or void space that extends substantially perpendicularly away from the plane in which the panel body 62 lies. In some embodiments, the battery compartment 100 may include a substantially rectangular opening through the panel body 62 that is shaped and sized to enable a battery model that is operable with the riding vehicle 10 to be placed into the battery compartment 100.

In some example embodiments, a battery door 110 may be molded from a separate piece of plastic or other material from that of the back panel 60. The battery door 110 may include a door body 112 that may be formed from a substantially plate-shaped piece of molded material. The battery door 110 may also include hinge protrusions 114 that may extend from one edge of the door body 112. The hinge protrusions 114 may be configured to be inserted through orifices that pass through the panel body 62 to form battery door hinge receivers. The battery door 110 may therefore be rotated between open and closed positions based on movement of the hinge protrusions 114 within the battery door hinge receivers. When opened (as shown in FIG. 2), the battery door 110 may rotate about the hinge protrusions 114 such that the door body 112 is in a position that is substantially perpendicular to a plane in which the panel body 62 lies. Meanwhile, when closed (as shown in FIGS. 3 and 4), the battery door 110 may rotate about the hinge protrusions 114 such that the door body 112 substantially covers the entirety of the rectangular opening through the panel body 62. As such, when closed, the door body 112 of the battery door 110 may lie substantially in a plane that is parallel to the plane in which the panel body 62 lies. In some embodiments, edges of the door body 112 may be formed to have a substantially rectangular shape such that the edges of the door body 112 extend beyond the boundaries of the opening through the panel body 62 that forms the entry into the battery compartment 100. In some cases, the battery door 112 may form a seal or seating surface with the panel body 62 around the rectangular opening through the panel body 62 at the battery compartment 100 when the battery door 110 is closed. Such a seal may be useful in the illustrated example riding vehicle where the placement of the battery compartment 100 may expose the battery door 110 to grass clippings in the bagging attachment 12.

Figure 5A:
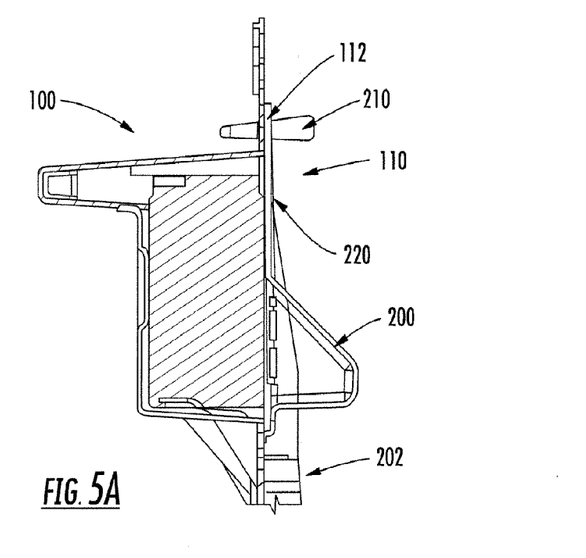
FIGS. 5A and 5B, illustrates a cross section view of the battery compartment with a battery door closed (FIG. 5A) and opened (FIG. 5B) according to an example embodiment.
Figure 5B:
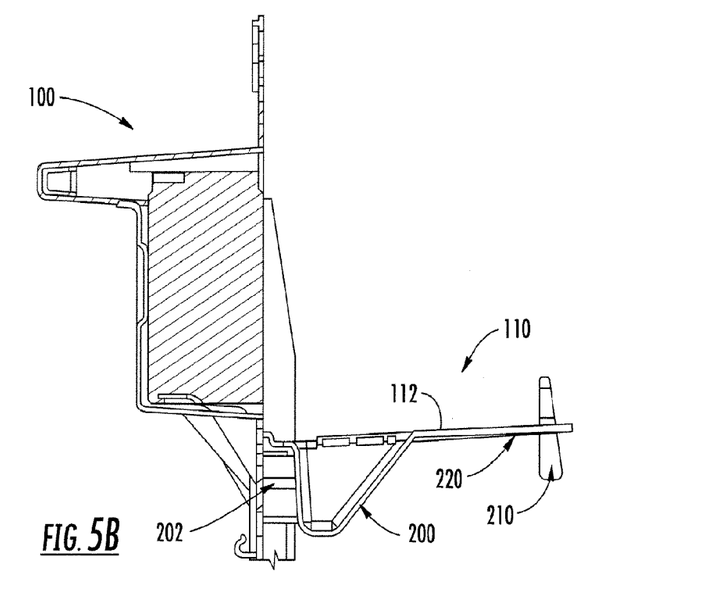
Figure 6:
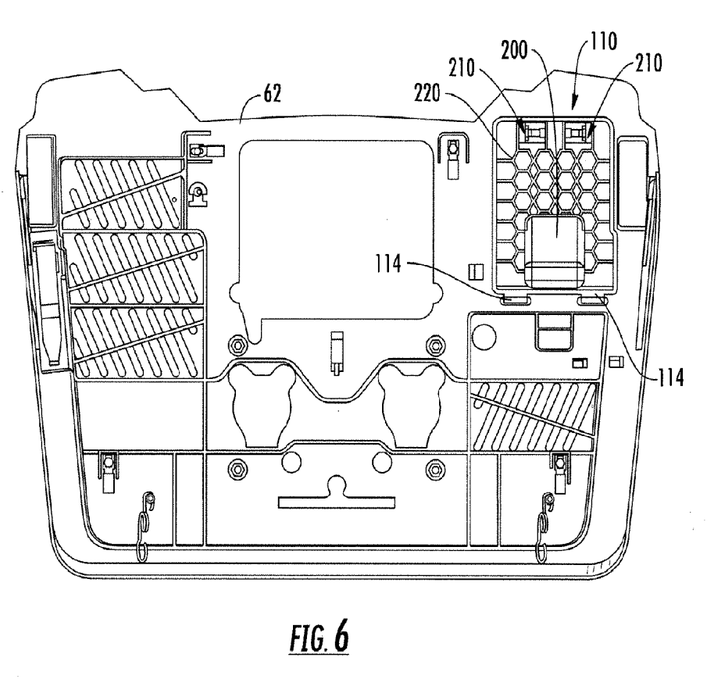
FIG. 6 illustrates a front view of a portion of the back panel that includes the battery compartment to further illustrate design features of the battery door according to an example embodiment.
Figure 7:
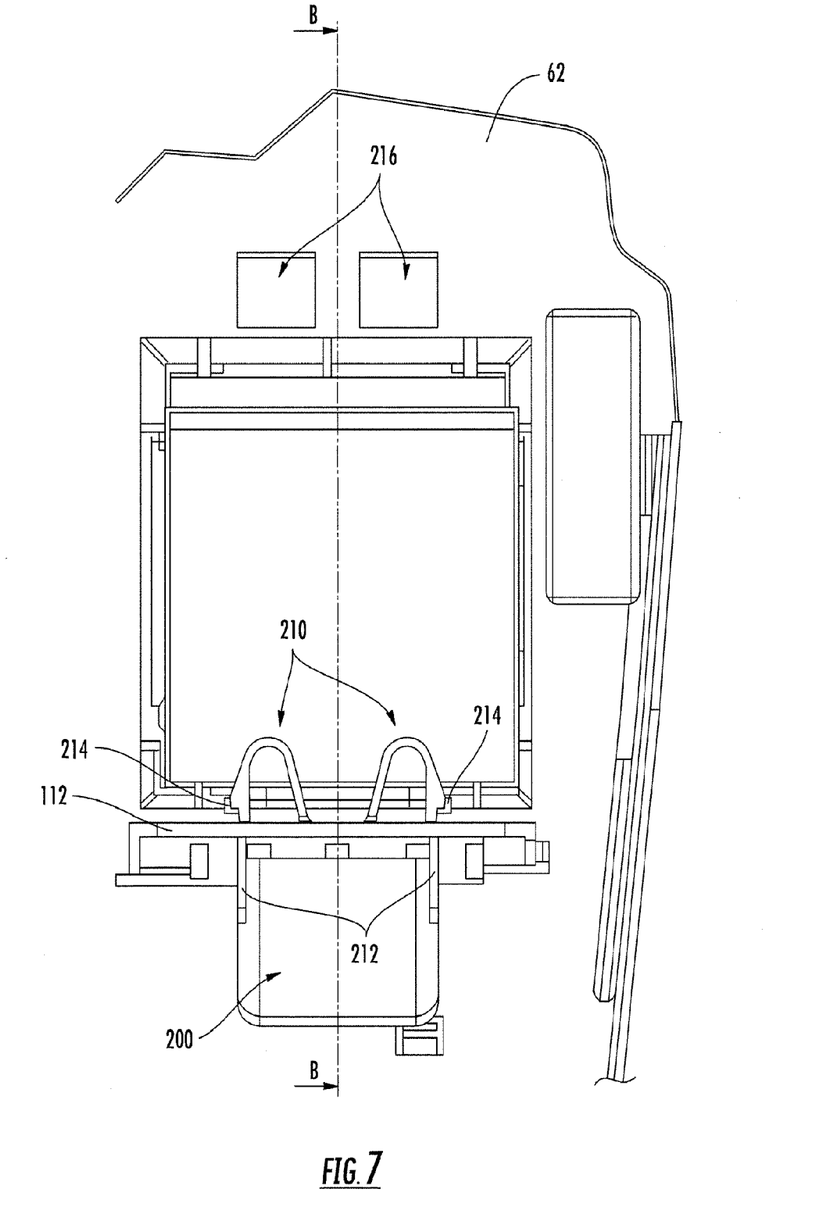
FIG. 7 illustrates a front view of the battery door in an open position to illustrate features of a closure assembly of the battery door according to an example embodiment.

FIG. 5, which includes FIGS. 5A and 5B, illustrates a cross section view of the battery compartment 100 with the battery door 110 closed (FIG. 5A) and opened (FIG. 5B) according to an example embodiment. FIG. 6 illustrates a front view of a portion of the back panel 60 that includes the battery compartment 100 to further illustrate some design features of the battery door 110 according to one example embodiment. FIG. 7 illustrates a front view of the battery door 110 in an open position to illustrate features of a closure assembly of the battery door 110 according to one example embodiment. Referring now to FIGS. 5 to 7, the battery door 110 may further include a support protrusion 200. The support protrusion 200 may extend substantially away from the plane in which the door body 112 lies. The support protrusion 200 may also be positioned proximate to an edge of the door body 112 from which the hinge protrusions 114 extend. In some embodiments, the support protrusion 200 may be positioned proximate to an edge of the door body 112 and substantially between the hinge protrusions 114. The support protrusion 200 may provide rigidity to the battery door 110 and may also engage support structures 202 that extend from the panel body 62 to support the battery door 110 when the battery door 110 is opened as shown in FIG. 5B. In this regard, since a battery can be a relatively heavy component, if the battery door 110 only included the door body 112 without the support protrusion 200, it would likely damage the battery door 110 if a battery were placed on the battery door 110 while the door is in the open position. By including the support structures 202 and reinforcing the strength of the battery door 110 with the support protrusion 200, an opened battery door 110 may have the strength to support the weight of the battery. Thus, the battery may be allowed to sit on the battery door 110 when cables are installed or during other operations involving the battery compartment 100 to increase the ease of cable installation and other battery related activities.

In some embodiments, the battery door 110 may be rotated to a closed position and then affixed to the panel body 62 using a closure assembly 210. The closure assembly 210 may include closure tabs 212 that extend through the door body 112 in a direction that is substantially perpendicular to the plane in which the door body 112 lies. In an example embodiment, the closure tabs 212 may be positioned on the door body 112 proximate to an edge of the door body 112 that is opposite to the edge of the door body 112 from which the hinge protrusions 114 extend. The closure tabs 212 may include a portion that is reachable by an operator from a side of the door body 112 that is opposite to a position of the battery compartment 100 when the battery door 110 is closed. Moreover, the closure tabs 212, which may be part of the same molded piece of plastic or other material that forms the battery door 110, may be flexible such that they may be drawn toward each other to release engagement with the panel body 62. In this regard, for example, the closure tabs 212 may be constructed to be biased to have a rest position that leaves the closure tabs 212 relatively far apart from each other. However, since the closure tabs 212 are flexible, the closure tabs may be drawn toward each other out of the rest position.

In some embodiments, the closure tabs 212 may each include a corresponding engagement detent 214. The engagement detents 214 may be positioned such that they are oriented in directions substantially opposite to one another. In an example embodiment, the panel body 62 may include a door closure orifice 216 corresponding to each closure tab 212. In this regard, each door closure orifice 216 may be an opening that passes through the panel body 62 at a portion of the panel body 62 that is proximate to an edge of the opening in the panel body 62 that forms the battery compartment 100. Thus, the door closure orifices 216 may be positioned proximate to the opening in the panel body 62 that forms the battery compartment 100 on a side of the opening that is opposite to the side on which the battery door hinge receivers are positioned to receive the hinge protrusions 114. When the battery door 110 is rotated toward the closed position, the engagement detents 214 may come into contact with corresponding edges of the door closure orifices 216. The engagement detents 214, which may be biased to be extended away from each other, may then be retracted inward toward each other via contact with corresponding edges of the door closure orifices 216 as force if put on the battery door 110 to close the battery door 110. Once the engagement detents 214 clear the panel body 62, the engagement detents 214 may extend outward toward their rest positions to engage the battery door 110 to the panel body 62 and securely hold the battery door 110 in the closed position. As indicated above, the closure tabs 212 may be squeezed toward each other to retract the engagement detents 214 such that they move away from the rest position by an amount sufficient to allow the engagement detents 214 to clear the panel body 62 and be withdrawn from respective ones of the door closure orifices 216 as the battery door 210 is rotated to the open position.

In an example embodiment, the door body 112 may further include support ribs 220 that may be molded into the door body 112. The support ribs 220 may form be embossed on a surface of the door body 112 to provide further rigidity and support to the door body 112. Although not required, in some embodiments, the support ribs 220 may form a pattern on the door body 112.

Figure 8:
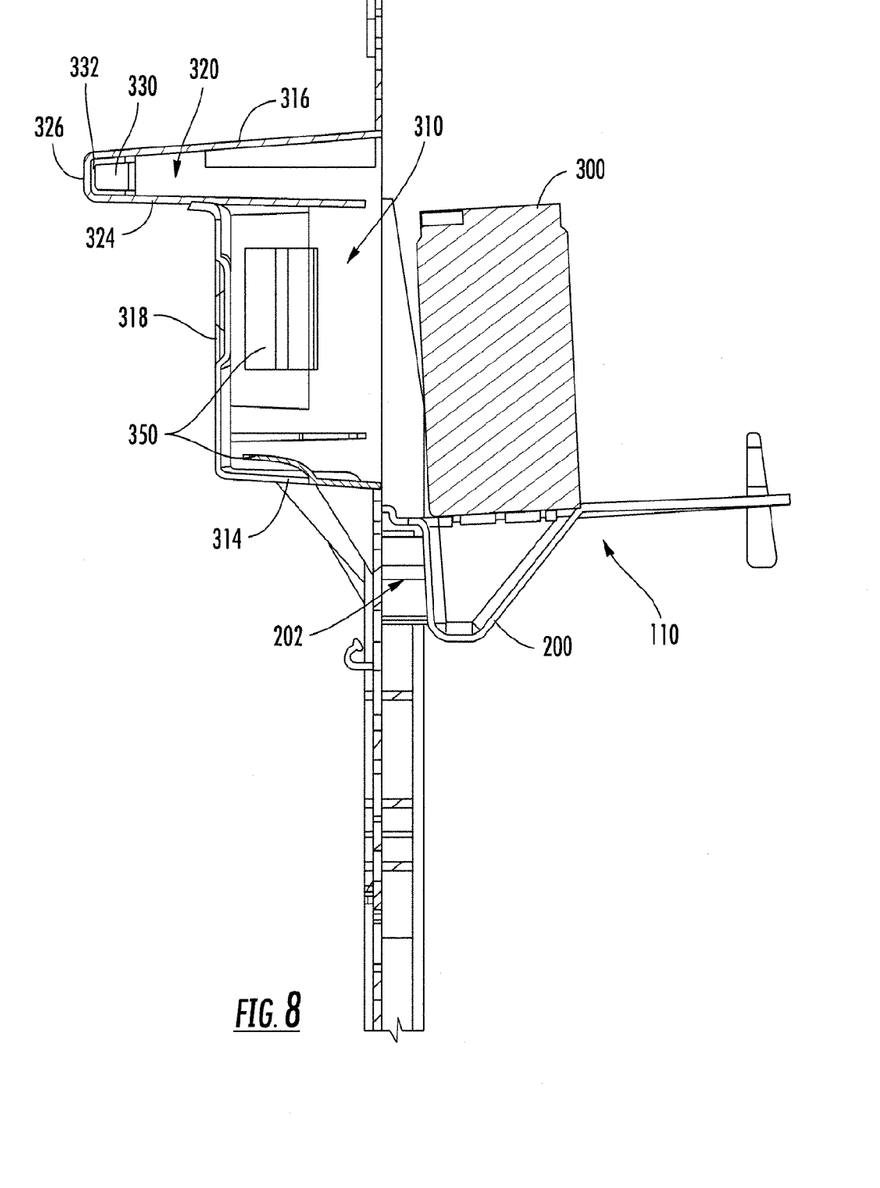
FIG. 8 illustrates a cross section view of the battery compartment with the battery door open and a battery positioned on a support protrusion of the battery door according to an example embodiment.
Figure 9:
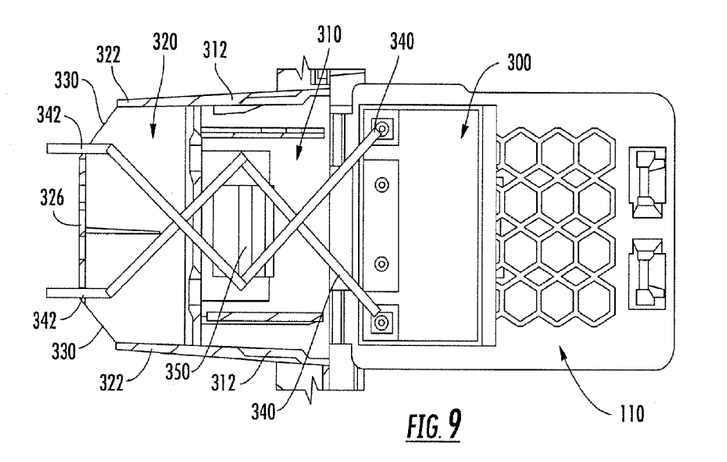
FIG. 9 illustrates a top view of the battery compartment with the battery door open and a battery positioned on the support protrusion according to an example embodiment.
Figure 10:
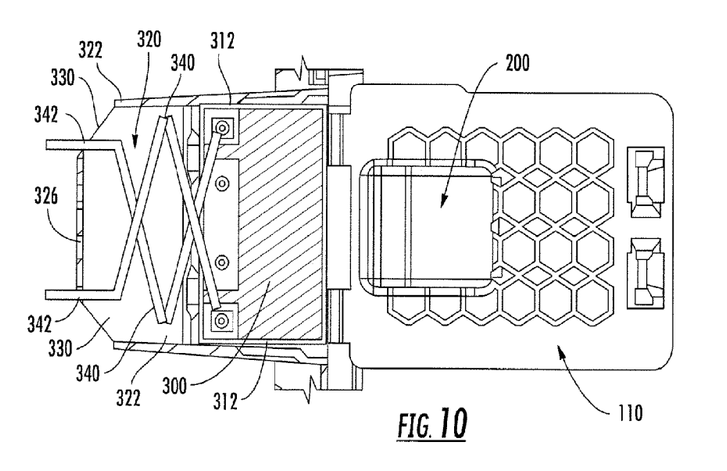
FIG. 10 illustrates a top view of the battery compartment with the battery door open and the battery positioned in the battery pocket according to an example embodiment.

The battery compartment 100 will now be described in greater detail in reference to FIGS. 2, 4, 5 and 8-10. In this regard, FIG. 8 illustrates a cross section view of the battery compartment 100 with the battery door 110 open and a battery 300 positioned on the support protrusion 200 according to an example embodiment. FIG. 9 illustrates a top view of the battery compartment 100 with the battery door 110 open and a battery 300 positioned on the support protrusion 200 according to an example embodiment. FIG. 10 illustrates a top view of the battery compartment 100 with the battery door 110 open and a battery 300 positioned in the battery pocket according to an example embodiment.

In some example embodiments, the battery compartment 100 may be divided into at least two sub-compartments including a battery pocket 310 and a cable pocket 320. The battery pocket 310 may be formed to create a void space that has, for example, a rectangular prism shape to form a receptacle for the battery 300. As such, the void space within the battery pocket 310 may be slightly larger than the dimensions of the battery 300. The battery pocket 310 may defined between sidewalls 312 of the battery compartment 100 that may be positioned opposite to one another with respect to the void space, a bottom wall 314 of the battery compartment 100 extending between the bottom distal ends of the sidewalls 312, and a top wall 316 of the battery compartment 100 extending between top distal ends of the sidewalls 312. A back wall 318 may extend from the bottom wall 314 toward the top wall 316 between the sidewalls 312.

In an example embodiment, the sidewalls 312, the bottom wall 314, and the top wall 316 may be fully defined by plastic (or other material) forming boundaries that define the corresponding walls. Meanwhile, the back wall 318 may be defined by plastic (or other material) frame structures (that crisscross in this embodiment) rather than being a complete plastic wall. However, it should be appreciated that in some alternative embodiments, any of the walls (in any desirable combination) could be fully or partially formed in plastic or some other material. A top portion of the battery pocket 310 may be open to the cable pocket 320, which may be positioned adjacent to the battery pocket 310 at the top wall 316 of the battery compartment 100. As such, for example, an extension 322 may be provided at a top portion of each of the sidewalls 312. The extension 322 may be extended away from the panel body 62 to define side boundaries for the cable pocket 320. The top wall 316 may be extended to pass between top portions of each of the extensions 322 to define a top boundary of the cable pocket 320. A cable platform 324 may extend parallel to the bottom wall 314 to define a bottom boundary for the cable pocket 320. When cables 340 are installed in the cable pocket 320 and connected to terminals of the battery 300, the cables may rest on the cable platform 324. A back boundary of the cable pocket 320 may be defined by pocket back 326.

In an example embodiment, proximate to an intersection of the pocket back 326 and each extension 322 cable grips 330 may be provided. The cable grips 330 may be defined by tabs that form a portion of the same unitary molded plastic piece that forms the back panel 60 and other portions of the battery compartment 100. A cable passage 332 may be defined between the cable grips 330 an adjacent portions of a wall defining the cable pocket 310. In this example, the cable passage 332 is defined between the cable grips 330 and a portion the top wall 316, the pocket back 326, and/or the cable platform 324. The cable passage 332 may be defined around one, two, or three sides of the cable grips 330. A clearance space between the cable grips 330 and adjacent portions of the walls defining the cable pocket 320 is smaller than a diameter of the cables 340. The cable grips 330 are flexible enough so that they can bend inward into the cable pocket 320 when the cables 340 are inserted into the cable pocket 320 through the cable passage 332. Accordingly, after the cables 340 are passed through the cable passage 332 into the cable pocket 320 for connection to the terminals of the battery 300, a force is exerted on the cables 340 by the flexible cable grips 330 at a pinch point 342 where the cables 340 rest between the cable grips 330 and the adjacent portions of the walls defining the cable pocket 320. This force may prevent movement of the cables 340 responsive to vibration and/or undulation or other jarring forces that may be encountered during operation of the riding vehicle 10. The force may also prevent the cables 340 from being pushed out of the cable pocket 320 through the cable passage 332 when the battery 300 is inserted into the battery compartment 100 since the cable grips 330 pinch the cables at the pinch point 342 responsive to movement of the cables 320 in the cable passage 332 in a direction opposite the battery 300.

Accordingly, when the battery 300 is fully inserted into the battery compartment 100, the cables 340 may be naturally folded into the cable pocket 320 as shown in FIG. 10. Since the cables 340 are folded, and the pinch point 342 of the cables 340 is fixed, the cables will not be forced out of the cable pocket 320 and potentially into proximity of the rear wheels 52 (which could damage the cables 340). Similarly, when the battery 300 is to be withdrawn from the battery compartment 100, the cables 340 may extend to permit withdrawal of the battery 300 from the battery compartment 100 without movement of the cables 340 at the pinch point 342. Thus, the force on the pinch point 342 may maintain a position of the cables 340 relatively fixed at a point where the cables 340 enter the cable pocket 320 so that portions of the cables that are within the cable pocket 320 may extend from and fold into the cable pocket 320 as needed. In this regard, the force on the pinch point 342 may be relatively higher to resist movement of the cables 340 out of the cable pocket 320 and lower with respect to resisting movement of the cables 340 further into the cable pocket 320. The cables 340 are provided having an appropriate length that allows for the battery 300 to be removed from the battery compartment 300 and placed on the battery door 110. In one embodiment, the length of the cables 340 provides at least some slack in the cables 340 even when the battery is removed from the battery compartment 100 and resting on the battery door 110 so that the two cables retain opposite accordion-like folds even after the battery 300 is repeatedly removed from and placed into the battery compartment 100.

Fixing at least a portion of the cables 340 may restrict the possibility that the cables 340 may be forced (either by insertion of the battery 300 into the battery compartment 110 or by vibration or other movement caused during riding vehicle 10 operation) out of the cable pocket 320 and into proximity of the rear wheels 52 or other components. Furthermore, providing such fixing with the cable grips 330 may enable manufacturers to fix cable position without increasing cost and complexity associated with having additional parts to tie up, hold or otherwise fix the position of the cables since the cable grips 330 are part of the same unitary molded plastic (or other material) that forms the back panel 60. It may also be desirable to fix the position of the battery 300 itself in a similar manner (e.g., without external components).

In an example embodiment, the battery pocket 310 may include one or more grip tabs 350 that may extend from a portion of one or more of the sidewalls 312, the bottom wall 314, and the top wall 316 of the battery compartment 100. The grip tabs 350 may also be formed from the same unitary molded plastic (or other material) that forms the back panel 60. In an example embodiment, one or more of the grip tabs 350 may extend from each of the sidewalls 312, the bottom wall 314, and the top wall 316 of the battery compartment 100 to grip the battery 300 as the battery 300 is inserted into the battery compartment 100. In this regard, generally speaking, the grip tabs 350 of some example embodiments may be formed such that each grip tab extends from a proximal end that is in contact with its respective wall to a corresponding distal end that is not normally in contact with its respective wall (e.g., similar to a leaf spring). The longitudinal length of each grip tab may be swept toward the back wall 318 of the battery compartment 100 such that, for at least a portion of each grip tab, a distance between each grip tab and its respective wall increases as each grip tab extends from its corresponding proximal end to its corresponding distal end.

Accordingly, since the grip tabs 350 are constructed to extend into the void space increasingly more as they proceed from their proximal ends to their distal ends, an amount of pressure placed on the battery 300 by the grip tabs 350 may increase as the battery 300 is inserted into the battery compartment 100. In this regard, the increase in contact between the grip tabs 350 and the battery 300 during battery insertion may cause increasing frictional forces to be imparted on the battery 300 as the battery is inserted into the battery compartment 100. In some embodiments, since the proximal ends of the grip tabs 350 are fixed to the battery compartment 100 and the distal ends of the grip tabs 350 are free, the grip tabs 350 may act as a leaf spring and put spring forces on the battery 350 such that tension exerted by the spring forces responsive to insertion of the battery 300 into the battery compartment 100.

Moreover, since the grip tabs 350 of some example embodiments may be placed on opposite sides of each other relative to the void space into which the battery 300 is inserted in the battery compartment 100, the grip tabs 350 may increase the amount of tension placed on up to four sides of the battery 300 to prevent the battery 300 from moving in any direction during operation of the riding vehicle 10. In other embodiments, such as the embodiment illustrated in the figures, a grip tab 350 is molded into only one of the two sidewalls 312 so that it holds the battery 300 in position by pushing the battery 300 against the opposing sidewall when the battery 300 is inserted into the battery compartment 100. In the illustrated embodiment, a grip tab 350 is also molded into the bottom wall 314 so that it holds the battery 300 in position by pushing the battery 300 against the opposing top wall when the battery 300 is inserted into the battery compartment 100. In embodiments of the invention not illustrated, one or more grip tabs can be molded into one or more of the two sidewalls, the top wall, the bottom wall, the back wall, and the door.

By forming the grip tabs 350 from the same unitary molded plastic (or other material) that forms the back panel 60 (or at least the battery compartment 100 or compartment walls), the battery 300 may be secured with less expense and less complication than is typically done when straps or other additional parts are employed for such tasks. It will be appreciated that some embodiments of the invention provide a battery storage system having a battery securing system, a cable storage system, a battery access door, and a battery working platform all with two plastic molded structures (namely, the battery compartment and the door structures).

Figure 11:
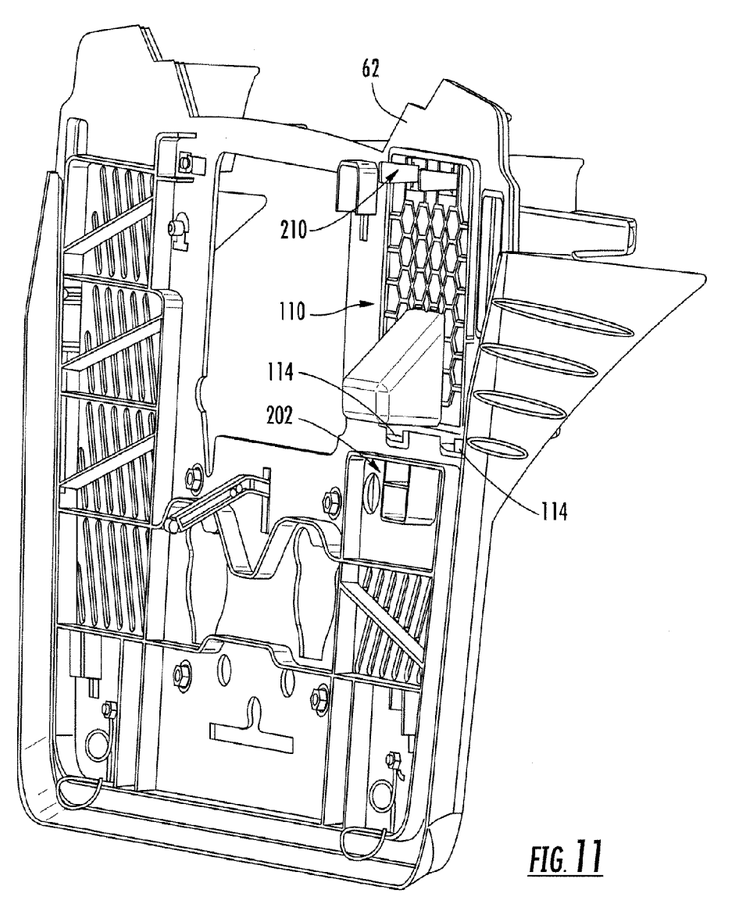
FIG. 11 illustrates an isometric view of the back panel presented from a right side looking at the rear of the riding vehicle with the battery door in the closed position according to an example embodiment.
Figure 12:
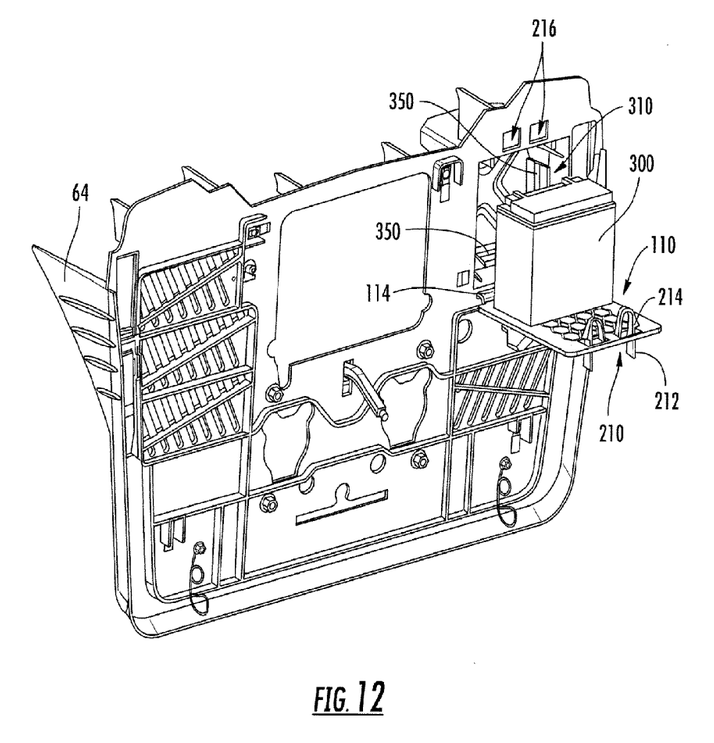
FIG. 12 illustrates an isometric view of the back panel presented from a left side looking at the rear of the riding vehicle with the battery door in an open position and the battery removed from the battery compartment to rest on the battery door according to an example embodiment.

FIG. 11 illustrates an isometric view of the back panel 60 that would be presented from a right side looking at the rear of the riding vehicle 10 with the battery door 110 in the closed position according to an example embodiment. FIG. 12 illustrates an isometric view of the back panel 60 that would be presented from a left side looking at the rear of the riding vehicle 10 with the battery door 110 in an open position and the battery 300 removed from the battery compartment to rest on the battery door 110 according to an example embodiment. The isometric views of FIGS. 11 and 12 are provided in order to give depth perspective to further illustrate aspects of the example embodiments described above. It should be appreciated that, although the battery compartment 100 is disposed at a position of the back panel 60 that is proximate to the right rear tire, the battery compartment 100 could be positioned at any suitable location on the back panel 60 or on other panels or locations in other example embodiments. For example, a similar battery compartment with integrated grip tabs and cable grips can be placed under the seat of the riding lawn mower or under the hood of a riding lawn mower or other riding vehicle. The battery compartment with the grip tabs and cable grips molded as a single unity structure may or may not be integrated with a body panel of the riding vehicle.

In another example embodiment, a method of manufacturing a battery compartment for a riding vehicle is provided. The method may include molding a panel of the riding vehicle such that the panel comprises an integrated battery compartment and grip tab formed from a same first unitary piece of material. The battery compartment may be configured to house a battery of the riding vehicle. The grip tab may be disposed in the battery compartment and extend from a wall of the battery compartment to engage the battery in response to insertion of the battery into the battery compartment. In some cases, molding the panel may include molding an integrated cable grip from the same first unitary piece of material. The cable grip may be disposed proximate to the battery compartment and configured to engage a battery cable in response to insertion of the battery cable into the battery compartment. In an example embodiment, the method may further include molding a battery door such that the battery door comprises an integrated hinge, support structure, and closure tab formed from a same secondary unitary piece of material. The hinge may be configured to engage the panel to hingedly couple the battery door with the panel and allow the door to be moved between an open position and closed position where the door at least partially restricts access to the battery compartment. The support structure may be configured to engage with the panel to support the weight of a battery when the door is in the open position. The closure tab may be configured to engage with the panel to hold the door in the closed position.

The panel (e.g., the back panel), battery door, battery compartment, battery compartment walls, grip tabs, cable grips, and/or other structures described herein are, in one embodiment, molded from a polymeric material, such as, for example, polyethylene, polypropylene, polystyrene, PVC, rubber, synthetic rubber, and/or other natural or synthetic polymers or combinations thereof. Molding the polymeric material(s) into the panel, battery door, and/or other structures described herein may be performed using injection molding, transfer molding, compression molding, thermoforming, and/or other known molding techniques.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding vehicle comprising:
a battery compartment configured to house a battery of the riding vehicle; and
a grip tab disposed in the battery compartment and extending from a wall of the battery compartment to engage the battery in response to insertion of the battery into the battery compartment,
wherein the grip tab and at least a portion of the battery compartment are formed from a same unitary piece of material,
wherein the battery compartment comprises:
a battery pocket housing the battery when the battery is inserted into the battery compartment; and
a cable pocket housing at least one cable connectable to the battery, and
wherein the cable pocket includes a cable grip defining a clearance space between the cable grip and an adjacent portion of a wall of the cable pocket, the clearance space being smaller than a diameter of the at least one cable to fix a position of the at least one cable relative to the cable pocket at a pinch point.

2. The riding vehicle of claim 1, wherein the cable grip and the battery compartment are formed from a unitary piece of material.

3. The riding vehicle of claim 1, wherein a top wall and sidewalls of the cable pocket are extensions of at least a portion of the sidewalls and top wall of the battery pocket.

4. The riding vehicle of claim 1, wherein the grip tab includes a proximal end that is fixed to a wall of the battery pocket and a distal end that is free.

5. The riding vehicle of claim 1, wherein the riding vehicle is a riding lawn mower.

6. The riding vehicle of claim 1, wherein the grip tab and the battery compartment are formed from a same unitary piece of material.

7. The riding vehicle of claim 1, comprising:
grip tabs disposed in the battery compartment and extending from at least two walls of the battery compartment to engage the battery in response to insertion of the battery into the battery compartment.

8. The riding vehicle of claim 1, further comprising:
a panel in which the battery compartment is formed; and
a battery door including a support protrusion to engage support structures extending from the panel to support the battery door when the battery door is rotated to an open position.

9. The riding vehicle of claim 8, wherein the battery door and the support protrusion are formed from a same unitary piece of material.

10. A riding vehicle comprising:
a battery compartment configured to house a battery of the riding vehicle;
a grip tab disposed in the battery compartment and extending from a wall of the battery compartment to engage the battery in response to insertion of the battery into the battery compartment; and
a back panel configured to connect to a bagging attachment of the riding vehicle, wherein the battery compartment is a portion of the back panel,
wherein the grip tab and at least a portion of the battery compartment are formed from a same unitary piece of material, and wherein the back panel further comprises a rear discharge receiver and a bagging attachment support rod receiver.

11. The riding vehicle of claim 10, wherein the battery compartment comprises:
a battery pocket housing the battery when the battery is inserted into the battery compartment; and
a cable pocket housing at least one cable connectable to the battery.

12. The riding vehicle of claim 11, wherein the cable pocket includes a cable grip defining a clearance space between the cable grip and an adjacent portion of a wall of the cable pocket, the clearance space being smaller than a diameter of the at least one cable to fix a position of the at least one cable relative to the cable pocket at a pinch point.

13. The riding vehicle of claim 10, wherein the riding vehicle is a riding lawn mower.

14. The riding vehicle of claim 10, further comprising:
a panel in which the battery compartment is formed;
a battery door including a support protrusion to engage support structures extending from the panel to support the battery door when the battery door is rotated to an open position.

15. The riding vehicle of claim 14, wherein the battery door and the support protrusion are formed from a same unitary piece of material.

16. The riding vehicle of claim 10, wherein the grip tab comprises a first grip tab extending from one of a sidewall or a bottom wall of the battery compartment, and wherein a second grip tab extends from the other of the sidewall or the bottom wall of the battery compartment.

17. A riding vehicle comprising:
a battery compartment configured to house a battery of the riding vehicle;
a grip tab disposed in the battery compartment and extending from a wall of the battery compartment to engage the battery in response to insertion of the battery into the battery compartment
a panel formed from the same unitary piece of material as the battery compartment; and
a battery door including a hinge protrusion positioned at one end of the battery door to engage a battery door hinge receiver defined in the panel, wherein the hinge protrusion is formed from a same unitary piece of material as the battery door,
wherein the grip tab and at least a portion of the battery compartment are formed from a same unitary piece of material, and
wherein the battery door further comprises a support protrusion disposed proximate to the hinge protrusion to engage support structures extending from the panel to support the battery door when the battery door is rotated about the hinge protrusion to an open position, wherein the support protrusion is formed from the same unitary piece of material as the battery door.

18. The riding vehicle of claim 17, wherein the battery door further comprises a closure assembly comprising a flexibly releasable closure tab configured to engage a corresponding door closure orifice in the panel to hold the battery door in a closed position, wherein the flexibly releasable closure tabs are formed from the same unitary piece of material as the battery door.

19. The riding vehicle of claim 17, wherein the riding vehicle is a riding lawn mower.

20. The riding vehicle of claim 17, wherein the grip tab comprises a first grip tab extending from one of a sidewall or a bottom wall of the battery compartment, and wherein a second grip tab extends from the other of the sidewall or the bottom wall of the battery compartment.

\* \* \* \* \*